United States Patent
Kreuter

[19]

[11] Patent Number: 5,960,750

[45] Date of Patent: Oct. 5, 1999

[54] DEVICE FOR CHANGING COMPRESSION OF A RECIPROCATING PISTON INTERNAL COMBUSTION ENGINE

[75] Inventor: Peter Kreuter, Aachen, Germany

[73] Assignee: Meta Motoren- und Energie- Technik GmbH, Herzogenrath, Germany

[21] Appl. No.: 09/017,898

[22] Filed: Feb. 3, 1998

[30] Foreign Application Priority Data

Feb. 3, 1997 [DE] Germany .......................... 197 03 948

[51] Int. Cl.⁶ ................................................. F02B 75/04
[52] U.S. Cl. ........................................................ 123/48 B
[58] Field of Search .............................. 123/48 B, 78 E, 123/78 F

[56] References Cited

FOREIGN PATENT DOCUMENTS

| | | |
|---|---|---|
| 3818357 | 3/1989 | Germany . |
| 4226361 | 4/1994 | Germany . |
| 5838343 | 3/1983 | Japan ..................................... 123/78 E |

*Primary Examiner*—Noah P. Kamen
*Attorney, Agent, or Firm*—Robert W. Becker & Associates

[57] ABSTRACT

A device for changing compression of an internal combustion engine, wherein the internal combustion engine has a cylinder, a piston reciprocating in the cylinder, a crankshaft having a crank, and a connecting rod having a first end connected to the crank and a second end connected to the piston, includes an eccentric bushing resting with an inner cylindrical surface on the crank and with an eccentric outer cylindrical surface at the connecting rod so that by rotating the eccentric bushing relative to the connecting rod an effective length of the connecting rod is changed. The eccentric bushing has a least two locking recesses. A locking member is connected to the connecting rod and moveable in different directions into one or the other of the at least two locking recesses for locking the eccentric bushing in a first and second rotational position. In a first rotational position the effective length of the connecting rod is at a maximum and in a second rotational position the effective length of the connecting rod is at a minimum.

13 Claims, 3 Drawing Sheets

DEVICE FOR CHANGING COMPRESSION OF A RECIPROCATING PISTON INTERNAL COMBUSTION ENGINE

BACKGROUND OF THE INVENTION

The present invention relates to a device for changing compression of a reciprocating piston internal combustion engine comprising a crankshaft that is supported within the motor housing, a connecting rod supported at a crank of the crankshaft, a piston reciprocating within a cylinder of the motor housing and supported at the connecting rod, and an eccentric bushing which with its cylindrical inner surface is supported at the crank and with an eccentric outer cylindrical surface resting at the connecting rod so that by rotation of the bushing relative to the connecting rod the effective length of the connecting rod can be changed.

An adaptation of the compression to the respective operating conditions of an internal combustion engine, especially in regard to load conditions under which the internal combustion engine operates, has been desired for a long time. For example, when during minimal load the compression is increased and at full load is reduced, a considerable fuel reduction and a greater possible output distribution range can be achieved.

From German patent 42 26 361 a device for changing the compression of a reciprocating piston internal combustion engine of the aforementioned kind is known in which within the connecting rod a crank pin bearing is provided that is hydraulically adjustable by an eccentric. The eccentric is an eccentric disc embodied as a circular or rotary piston having at least one radially projecting piston which is hydraulically displaceable in a radial extension of the eccentric disc bearing. The hydraulic supply for actuating the piston is realized by an oil supply from the crank case which requires a comparatively complicated design. In a further embodiment of the known device, the hydraulic piston can be loaded on both sides with hydraulic medium whereby the pressure chamber supporting the pushing force of the connecting rod during the intake stroke of the piston is opened for refilling with pressure medium by minimal displacement of the hydraulic piston and during the compression stroke is opened for pressure medium exhaust by the hydraulic piston. During the working stroke the pressure chamber is closed. An adjustment of the opening parameters is such that for the desired degree of compression pressure the hydraulic medium exhaust is identical to the pressure medium refill. In this manner a predetermined, optimal compression is to be maintained. The control of the pressure chambers is however relatively complicated. Also, the eccentric disc is rotated such that the crank pin bearing is arranged non-centrally relative to the connecting rod which in many respects results in unfavorable load distribution.

From German patent application 38 18 357 a device for changing the compression of a reciprocating piston internal combustion engine is disclosed in which the eye of the connecting rod is supported by an eccentric sleeve at the piston bolt. The eccentric sleeve or bushing comprises at its outer circumferential surface a plurality of cutouts which can be engaged by lungers, arranged within the connecting rod and movable by a high hydraulic medium, so that the rotary position of the eccentric bushing can be locked. The oil supply and the valves required for the control are of a relatively complicated design. In addition, constructive space is required within the piston.

It is therefore an object of the present invention to provide a device for changing the compression of a reciprocating piston internal combustion engine which provides a high degree of functional safety but has a simple design.

SUMMARY OF THE INVENTION

The device for changing compression of an internal combustion engine according to the present invention is primarily characterized by:

an eccentric bushing resting with an inner cylindrical surface on the crank and with an eccentric outer cylindrical surface at the connecting rod so that by rotating the eccentric bushing relative to the connecting rod an effective length of the connecting rod is changed;

the eccentric bushing having at least two locking recesses;

a locking member connected to the connecting rod, and said locking member movable in a first direction into a first one of the at least two locking recesses for locking the bushing in a first rotational position and movable in a second direction into a second one of the at least two locking recesses for locking the eccentric bushing in a second rotational position, wherein in the first rotational position the effective length of the connecting rod is at a maximum and the second rotational position the effective length of the connecting rod is at a minimum.

Advantageously, the device comprises an actuator acting on the locking member. The actuator has a first and a second actuating position, wherein in the first actuating position the actuator loads the locking member in the first direction and in the second actuating position in the second direction.

The eccentric bushing has opposed end faces comprising flanges, engaging first and second end faces of the connecting rod. The at least two locking recesses are preferably located in the flanges.

Preferably, the connecting rod has a bore parallel to the axis of the crank shaft. The bore is preferably located at the first end of the connecting rod such that the eccentric bushing is located between the bore and the second end. The locking member is advantageously a bolt guided in the bore.

The bolt has a hollow interior and two springs coaxially arranged adjacent to one another in the hollow interior. The actuator engages between the two springs.

Advantageously, the actuator is a lever supported at the connecting rod so as to have a longitudinal axis extending perpendicularly to the axis of the crank shaft. The lever is attached to the first end of the connecting rod so as to point in a direction away from the second end.

The device comprises spring-loaded snap elements and cooperating receiving surfaces, wherein the first and second actuating positions are defined by the snap elements engaging the receiving surfaces.

Preferably, the actuator is a slide slidably arranged at the first end of the connecting rod such that the eccentric bushing is located between the slide and the second end. The actuator in the first and second actuating position projects laterally past an end face of the connecting rod. The device may further comprise spring-loaded snap elements and cooperating receiving surfaces, wherein the first and second actuating positions are defined by the snap elements engaging the receiving surfaces.

Preferably, the device comprises a switching device for reciprocating the actuator between the first and the second actuating positions. The switching device is arranged at a location where the first end of the connecting rod is positioned when the piston is at bottom dead center.

The switching device may comprise a member that is moved into positions in which the member mechanically engages the actuator for reciprocating the actuator between the first and the second actuating positions.

The device may also comprise a device for rotating the eccentric bushing relative to the connecting rod.

The connecting rod has preferably a channel supplied with oil by the crankshaft, and the device for rotating the eccentric bushing includes a gear pump arranged in the channel. The gear pump is in rotary driving connection with the eccentric bushing.

The inventive device allows with only one locking member to lock the eccentric bushing into rotary positions whereby one rotary position of the eccentric bushing corresponds approximately to maximum compression and the other rotary position of the eccentric bushing corresponds to minimal compression. The actuation of the locking member is achieved advantageously mechanically from the exterior so that hydraulic valves and additional supply channels for a hydraulic medium are obsolete.

BRIEF DESCRIPTION OF THE DRAWINGS

The object and advantages of the present invention will appear more clearly from the following specifications in conjunction with accompanying drawings, in which.

DESCRIPTION OF PREFERRED EMBODIMENTS

The present invention will now be described in detail with the aid of several specific embodiments utilizing FIGS. 1 through 3.

Figure 1:
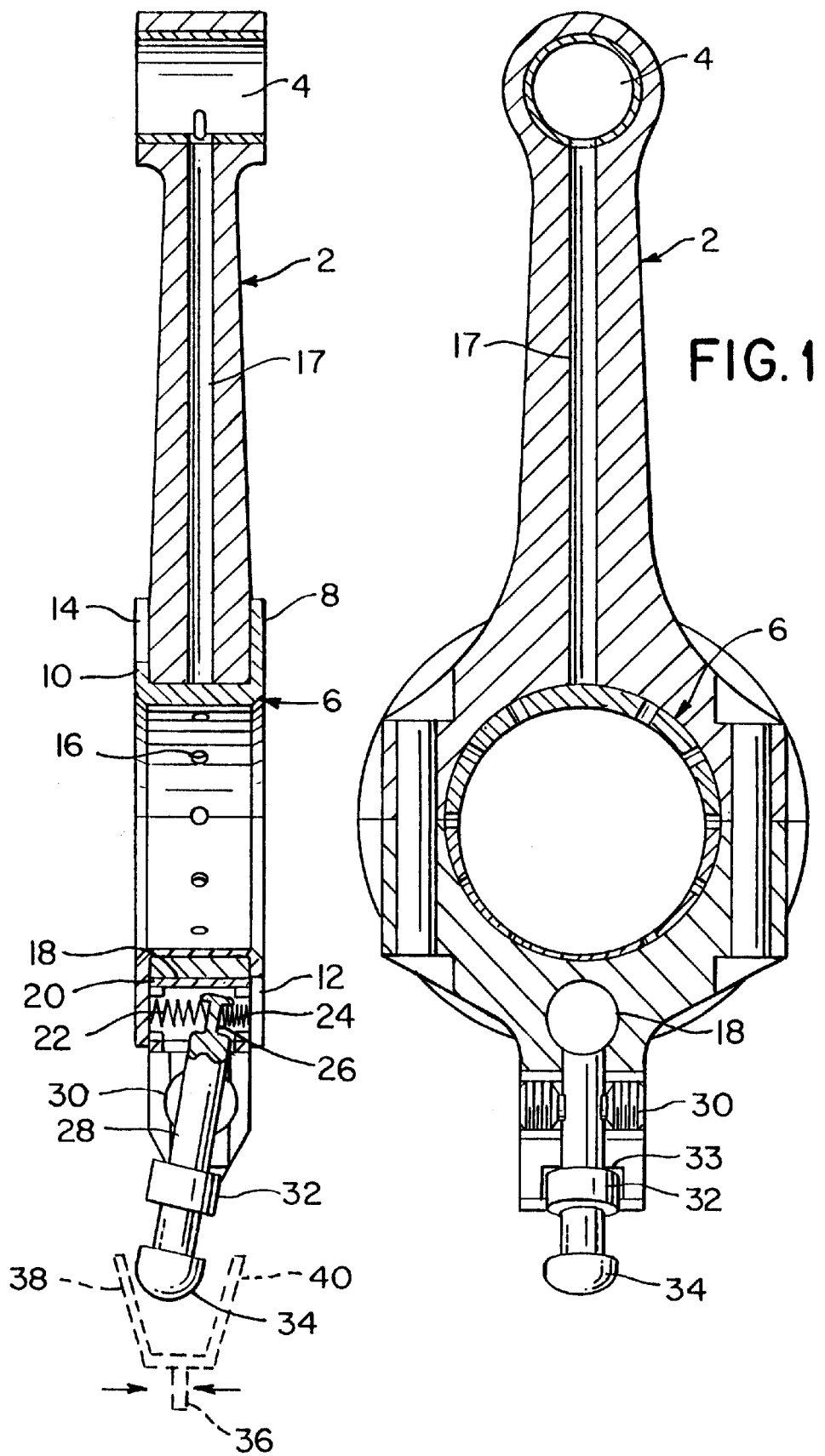
FIG. 1 shows two longitudinal sections of a first embodiment of the inventive device arranged at the connecting rod, whereby the two views show sections parallel and transverse to the bearing axis.

According to FIG. 1, the connecting rod 2 has an eye 4 for supporting the bolt of a piston. At the end of the connecting rod 2 facing away from the eye 4 the connecting rod is of a two part construction and provides an opening for supporting the crank pin of a crankshaft. The support of the connecting rod at the crank pin is not a direct support but is instead provided by the interposition of an eccentric bushing 6 resting with its cylindrical outer circumferential surface at the inner wall of the opening of the connecting rod and with its inner circumferential surface, eccentrically arranged to the outer circumferential surface, resting on the non-represented crank pin of the crankshaft supported within the motor housing.

The eccentric bushing 6 comprises two circumferential flanges 8 and 10 which engage the connecting rod 2 on both sides. Locking recesses 12 and 14 are provided within the flanges 8 and 10. The locking recesses 12 and 14 are staggered in the circumferential direction by approximately by 180° and are arranged such that they are intercepted by a plane which connects the center lines of the outer and inner circumferential surfaces of the eccentric bushing 6.

The bushing 6 is provided with through bores 16 via which the lubrication, originating from the crankshaft, of the outer circumferential surface of the eccentric bushing 6 and the oil supply of the channel 17 provided within the shaft of the connecting rod 2 is realized. The channel 17 provides the eye of the connecting rod 2 with oil.

FIG. 1 shows a bore 18 provided below the eccentric bushing 6 within the connecting rod 2 and extending parallel to its bearing axis wherein a locking member in the form of a hollow bolt 20 is slidably guided in the bore 18.

Within the bolt 20 two coaxially arranged springs 22 and 24 are arranged which are supported at a respective end face of the bolt 20 and a step 26 of a lever 28.

The lever 28 provided with the step 26 is pivotably supported within the connecting rod 2 transverse to the bearing axis. This is achieved by inserting a bushing into the connecting rod 2. The bushing is provided within an inner thread and a transverse bore through which the lever 28 extends. For supporting and securing the lever the bushing is provided at each end with a set screw engaging the lever 28. The lever 28 is guided at the connecting rod 2 by a known cam device that has two defined positions. FIG. 1 shows the position in which the lever 28 is rotated in a clockwise direction. The other position is symmetrical to the position shown in FIG. 1 but rotated to the left. The cam follower device is comprised of a cam follower 32 which is elastically preloaded in the upward direction. The cam follower 32 senses a cam surface 33 provided at the connecting rod 2 which is comprised of two slanted surfaces connected to one another by a projecting portion.

In one position, shown in FIG. 1, the lever 28 acting as a actuating member loads the right spring 24 so that the bolt 20 is preloaded to the right and engages the locking recess 12 when the eccentric bushing 6 is position in the corresponding rotational position (shown in FIG. 1). This position corresponds to the maximum effective connecting rod length and thus to the maximum compression rate. When the lever 28 is positioned in the other position, the spring 22 is compressed and the bolt 20 is preloaded to the left and engages the locking recess 14 when the eccentric bushing 6 is rotated by approximately 180°. This corresponds to the minimum effective connecting rod length and thus to the minimum compression.

It is understood that the length of the bolt 20 corresponds approximately to the thickness of the connecting rod 2 so that the rotation of the eccentric bushing 6 is not in impeded by the bolt 20 when none of the locking recesses 12 and 14 is aligned with the bolt 20. Furthermore, the lever 28 is designed such that it is not loaded by any force by the connecting rod movement which would cause it to assume a straight or aligned position relative to the connecting rod. The center of gravity of the lever 28 is thus advantageously positioned within the axis of the bearing 30.

For moving the lever 28 into one or the other position, a member 36 is provided which belongs to the switching device and can be moved according to the double arrow of FIG. 1 to the right or left. This member 36 has two stays 38 and 40. When a movement to the right occurs, the stay 38 engages the head 34 and entrains the lever 28 into its center position from where the lever 28 is automatically moved into the other end position. The relative movement of the member 36 to the lever 28 is such that the lever in the other position, similar to the situation shown in FIG. 1, is free relative to the two stays 38 and 40 so that the connecting rod can move freely through the stays.

The function of the disclosed device will be explained in connection with FIG. 3 in which a connecting rod 2 mounted within a combustion engine 50 is shown together with the reciprocating member 36. This member 36 is, for example, arranged within the oil pan of the internal combustion engine and is moveable axially relative to the crank shaft by two hydraulic or magnetically acting control cylinders 52 and 54 in one or the other position. For controlling the control cylinders, a control unit 56 is provided which is controlled by a control device 58 to which different operational parameters of the internal combustion engine such as load conditions, rpm etc. are supplied.

Figure 3:
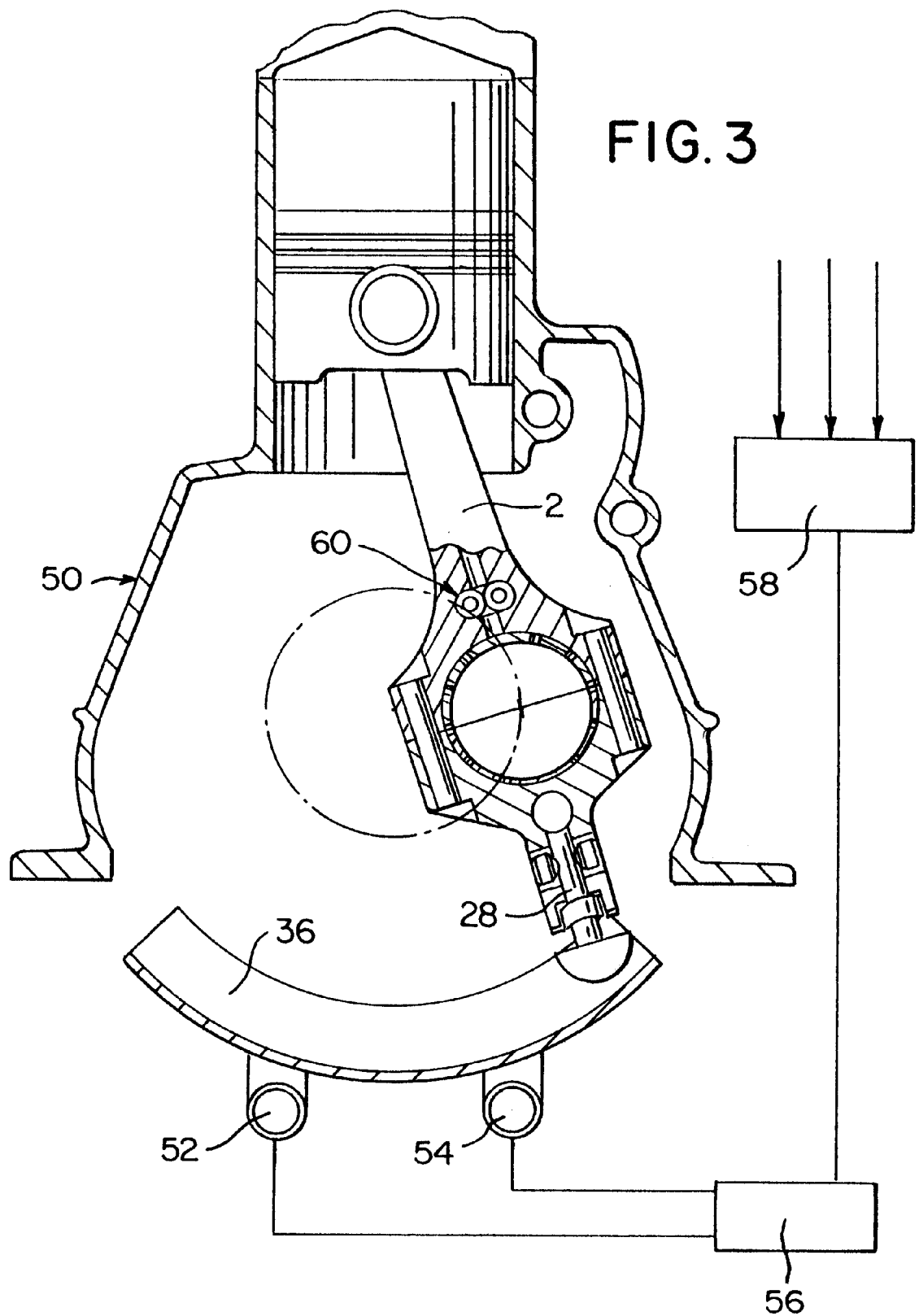
FIG. 3 shows a schematic cross-sectional view of a reciprocating piston internal combustion engine furnished with the inventive device.

When it is desired to reduce the compression of the internal combustion engine, which in the arrangement according to FIG. 3 is at its highest level, the member 36 is moved forward so that the lever 28 is flipped into the other position. The bolt 20 thus moves out of the presently occupied locking recess and is prestressed or preloaded into the direction of engagement with the other locking recess which is engaged by the bolt 20 as soon as the eccentric bushing 6 is rotated by approximately 180° relative to the connecting rod 2.

For changing the compression by multiple units, an eccentric embodiment of the eccentric bushing 6 by a few millimeters is sufficient for conventional motors.

The rotation of the eccentric bushing is, in general, performed automatically by the forces resulting from rotation of the crankshaft, respectively, from the connecting rod movement. In addition, a gear pump 60 (FIG. 3) may be provided which is driven by the oil supplied via the crankshaft into the channel 17. The gear pump 60 meshes via a gear wheel that is arranged coaxially to a gear wheel of the gear pump 60 with the outer toothing of the flanges 8 or 10. When the eccentric bushing 6 is locked with respect to is rotational position, the gear pump 60 cannot rotate oil supply to the piston bolt.

It is understood that the disclosed device can, be changed in many different ways. The bolt 20 serving as a locking member can, for example, be embodied as a lever which engages correspondingly embodied recesses at the eccentric bushing 6. The eccentric bushing 6 may be provided with a plurality of locking recesses so that locking of the eccentric bushing 6 in a plurality of rotational positions is possible and the compression can be changed in a stepped manner. The disclosed switching of the compression between a maximum and a minimum value has the advantage that the center line of the inner and outer circumferential surfaces of the bushing as well as the axis of the eye 4 are positioned in one common plane. The member 36 could be replaced by magnets for actuating the lever 28.

It is also possible to provide a device which brakes the relative rotation between eccentric bushing 6 and the connecting rod 2 in those areas in which the engagement action between the bolt 20 and the locking recesses 12, 14 takes place. This device may operate by friction, for example, by embodying the connecting rod so as to have a circumferential channel filled with oil such that the flow resistance for a projection connected to the bushing and penetrating into the circumferential channel is especially high in this range.

Figure 2:
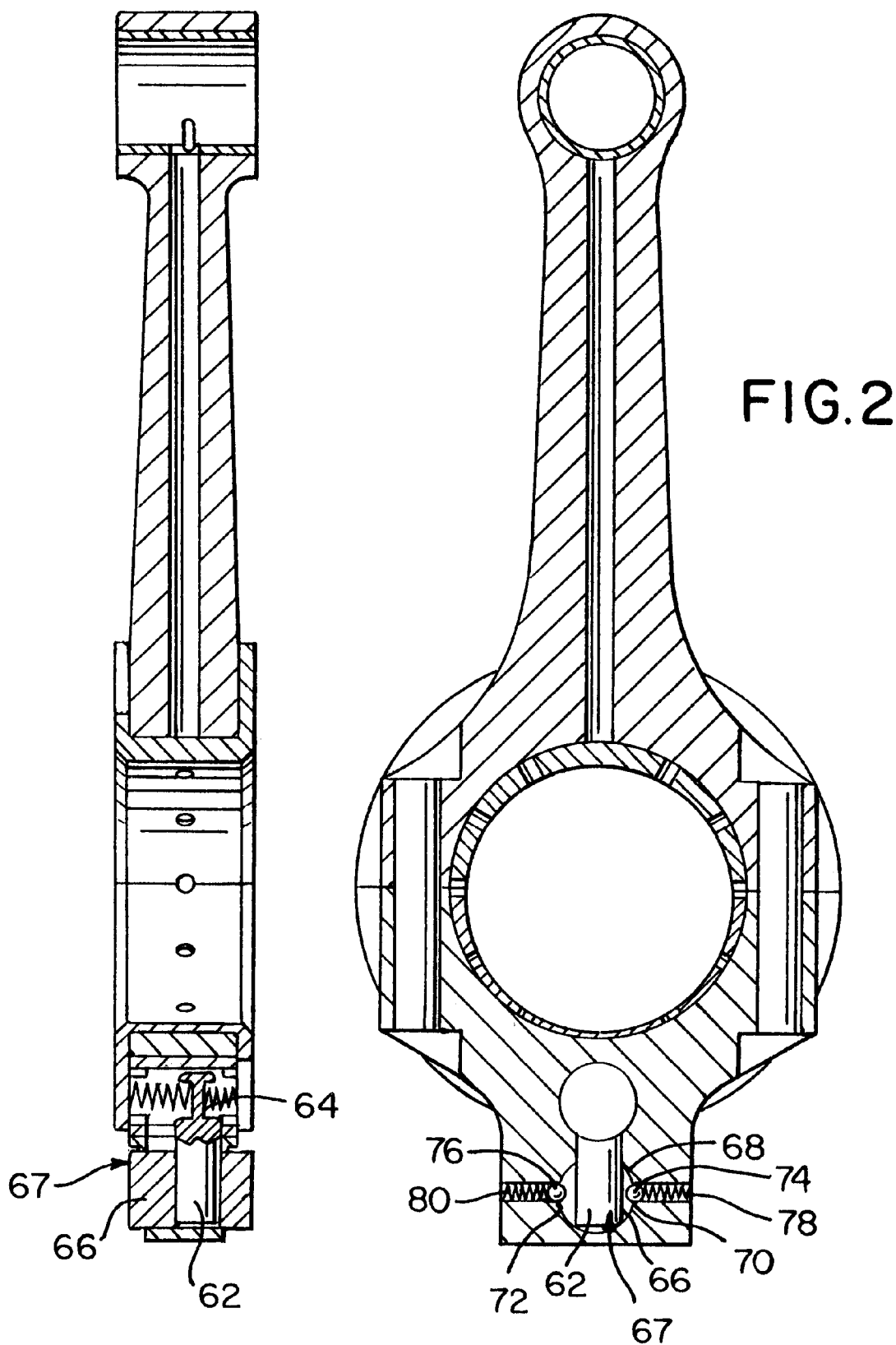
FIG. 2 shows two longitudinal sections of a second embodiment of the inventive device arranged at the connecting rod, shown in section transverse to and in the direction of its bearing axes.

FIG. 2 shows an embodiment with an adjusting device that is integrated into the connecting rod 2. The embodiment of FIG. 2 deviates with respect to the actuation of the hollow bolt 20 from the embodiment of FIG. 1. In order to simplify the drawing, in FIG. 2 only those parts are identified with reference numerals which are changed relative to FIG. 1. The actuating member for the hollow bolt 20 in FIG. 2 is not in the form of a pivotable lever but in the form of a pin 62 which, similar to the lever 28, projects with a projection 64 into the area between the springs in the bolt 20. The pin 62 is inserted into a bolt 66 which is movable within a through bore 68 extending parallel to the bearing axis of the connecting rod. The bolt 66 projects past the lateral surfaces (end faces) of the connecting rod. The pin 62 together with the bolt 66 thus provides a slide 67 for actuating the hollow bolt 20 by springactivated loading. In order to lock the bolt 66 similar to the lever 28 into defined position, the bolt 66 is provided with lateral ramps 70 and 72 which are engaged by balls 74 and 76 which are preloaded by the springs 78 and 80 in the direction toward the ramps 70 and 72. With a correspondingly designed slanted embodiment of the ramps 72 and 74 it is achieved that the bolt 66 can be locked in a right position (shown to the left in FIG. 2) and in a left position (not represented). Otherwise, the function and control of the bolt 66 corresponds to that of the lever 28 of the embodiment of FIG. 1.

The specification incorporates by reference the disclosure of German priority document of 197 03 948.0 of Feb. 3, 1997.

The present invention is, of course, in no way restricted to the specific disclosure of the specification and drawings, but also encompasses any modifications within the scope of the appended claims.

What is claimed is:

1. A device for changing compression of an internal combustion engine, wherein the internal combustion engine has a cylinder, a piston reciprocating in the cylinder, a crankshaft having a crank, and a connecting rod having a first end connected to the crank and a second end connected to the piston, said device comprising:

an eccentric bushing resting with an inner cylindrical surface on the crank and with an eccentric outer cylindrical surface at the connecting rod so that by rotating the eccentric bushing relative to the connecting rod an effective length of the connecting rod is changed;

said eccentric bushing having at least two locking recesses;

a locking member connected to the connecting rod, said locking member movable in a first direction into a first one of said at least two locking recesses for locking said eccentric bushing in a first rotational position and moveable in a second direction into a second one of said at least two locking recesses for locking said eccentric bushing in a second rotational position, wherein in said first rotational position said effective length of the connecting rod is at a maximum and in said second rotational position said effective length of the connecting rod is at a minimum.

2. A device according to claim 1, comprising an actuator acting on said locking member, said actuator having a first and a second actuating position, wherein in said first actuating position said actuator loads said locking member in said first direction and in said second actuating position in said second direction.

3. A device according to claim 2, wherein said eccentric bushing has opposed end faces comprising flanges engaging first and second end faces of the connecting rod, wherein said at least two locking recesses are located in said flanges.

4. A device according to claim 2, wherein said connecting rod has a bore parallel to an axis of the crankshaft, wherein said bore is located at said first end of the connecting rod such that said eccentric bushing is located between said bore and said second end, and wherein said locking member is a bolt guided in said bore.

5. A device according to claim 4, wherein said bolt has a hollow interior and has two springs coaxially arranged adjacent to one another in said hollow interior, wherein said actuator engages between said two springs.

6. A device according to claim 2, wherein said actuator is a lever supported at the connecting rod so as to have a longitudinal axis extending perpendicularly to an axis of the crankshaft and wherein said lever is attached to said first end of the connecting rod so as to point in a direction away from said second end.

7. A device according to claim 6, comprising spring-loaded snap elements and cooperating receiving surfaces, wherein said first and second actuating positions are defined by said snap elements engaging said receiving surfaces.

8. A device according to claim 2, wherein said actuator is a slide slidably arranged at said first end of the connecting rod such that said eccentric bushing is located between said slide and said second end, wherein said actuator in said first and second actuating position projects laterally past an end face of the connecting rod.

9. A device according to claim 8, comprising spring-loaded snap elements and cooperating receiving surfaces, wherein said first and second actuating positions are defined by said snap elements engaging said receiving surfaces.

10. A device according to claim 2, comprising a switching device for reciprocating said actuator between said first and said second actuating positions, said switching device arranged at a location where said first end of the connecting rod is positioned when the piston is at bottom dead center.

11. A device according to claim 10, wherein said switching device comprises a member that is moved into positions in which said member mechanically engages said actuator for reciprocating said actuator between said first and said second actuating positions.

12. A device according to claim 1, comprising a device for rotating said eccentric bushing relative to the connecting rod.

13. A device according to claim 12, wherein the connecting rod has a channel supplied with oil by the crankshaft and wherein said device for rotating said eccentric bushing comprises a gear pump arranged in said channel, and wherein said gear pump is in rotary driving connection with said eccentric bushing.

\* \* \* \* \*